(12) United States Patent
Cremer et al.

(10) Patent No.: US 11,142,642 B2
(45) Date of Patent: Oct. 12, 2021

(54) POLYAMIDE COMPOSITION WHICH IS DYED IN BLACK, PRODUCTION AND USE THEREOF

(71) Applicant: BASF SE, Ludwigshafen am Rhein (DE)

(72) Inventors: Jens Cremer, Ludwigshafen (DE); Sebastian Wagner, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 106 days.

(21) Appl. No.: 16/481,608

(22) PCT Filed: Jan. 26, 2018

(86) PCT No.: PCT/EP2018/051951
§ 371 (c)(1),
(2) Date: Jul. 29, 2019

(87) PCT Pub. No.: WO2018/138256
PCT Pub. Date: Aug. 2, 2018

(65) Prior Publication Data
US 2019/0390056 A1    Dec. 26, 2019

(30) Foreign Application Priority Data

Jan. 30, 2017  (EP) ..................... 17153693

(51) Int. Cl.
| | |
|---|---|
| C08L 77/06 | (2006.01) |
| C08L 77/02 | (2006.01) |
| C08J 3/20 | (2006.01) |
| C09B 17/02 | (2006.01) |
| C09B 45/16 | (2006.01) |

(52) U.S. Cl.
CPC ............... *C08L 77/06* (2013.01); *C08J 3/203* (2013.01); *C08L 77/02* (2013.01); *C09B 17/02* (2013.01); *C09B 45/16* (2013.01); *C08L 2201/08* (2013.01); *C08L 2205/06* (2013.01)

(58) Field of Classification Search
CPC ...... C08L 77/06; C08L 77/02; C08L 2201/08; C08L 2205/06; C08J 3/203; C09B 17/02; C09B 45/16
USPC .......................................... 524/89
See application file for complete search history.

(56) References Cited

U.S. PATENT DOCUMENTS

2019/0031857 A1*  1/2019  Rautenberg .............. C08K 5/56

FOREIGN PATENT DOCUMENTS

| | | |
|---|---|---|
| DE | 102004049342 A1 | 4/2006 |
| DE | 102004050025 A1 | 4/2006 |
| EP | 53256 A1 | 6/1982 |
| EP | 584567 A2 | 3/1994 |
| EP | 675168 A1 | 10/1995 |
| EP | 1095030 A1 | 5/2001 |
| EP | 2716716 A1 | 4/2014 |
| WO | 1994012352 A1 | 6/1994 |
| WO | 2015036526 A1 | 3/2015 |
| WO | WO-2017144276 A1 * | 8/2017 ............. C08K 5/235 |

OTHER PUBLICATIONS

Herrmann et al., "Chapter 11 Colorants", Plastics Additives Handbook, 1989, pp. 637-708, 3rd ed. (editors Gächter et al.), Hanser Publishers, Munich-Vienna-New York.
International Search Report for International Application No. PCT/EP2018/051951, dated Apr. 13, 2018, 4 pages.
Troitzsch, "Chapter 12 Flame Retardants", Plastics Additives Handbook, 1989, pp. 709-747, 3rd ed. (editors Gächter et al.), Hanser Publishers, Munich-Vienna-New York.

* cited by examiner

*Primary Examiner* — Josephine L Chang
(74) *Attorney, Agent, or Firm* — Armstrong Teasdale LLP

(57) ABSTRACT

A black-colored polyamide composition is provided which comprises a chromium-containing azo dye in the form of a chromium complex and carbon black, and also glass fibers. Production of this polyamide composition and use thereof for the production of black-colored laser-inscribable polyamide moldings are also provided.

16 Claims, No Drawings

POLYAMIDE COMPOSITION WHICH IS DYED IN BLACK, PRODUCTION AND USE THEREOF

CROSS-REFERENCE TO RELATED APPLICATIONS

This application is a U.S. National Phase Application of PCT/EP2018/051951, filed Jan. 26, 2018, which claims the benefit of priority to EP Application No. 17153693.1, filed Jan. 30, 2017, the contents of which are hereby expressly incorporated by reference in their entirety.

BACKGROUND OF THE INVENTION

The present invention relates to a black-colored polyamide composition which comprises a chromium-containing azo dye in the form of a chromium complex and carbon black, and also glass fibers, production of this polyamide composition and use thereof for the production of black-colored laser-inscribable polyamide moldings.

PRIOR ART

Polyamides are polymers produced on a major scale worldwide, and are used not only in the main application sectors of foils, fibers and moldings (processing materials) but also for a wide variety of other purposes. The polyamides most widely produced are nylon-6 (polycaprolactam) and nylon 6,6 (nylon, polyhexamethyleneadipamide). Most of the industrially significant polyamides are semicrystalline or amorphous thermoplastic polymers featuring high heat resistance. Temperatures used in the coloring of, and any necessary further processing of, these polyamides are high: generally above 240° C. and sometimes above 300° C. Requirements placed on the colorants used, whether pigments or dyes, are thus more stringent than for polymers processed at lower temperatures, for example PVC or polyethylene.

Dyes, specifically when they are used in semicrystalline polyamides, are susceptible to undesired migration to the surface of the colored moldings or fibers. In the case of moldings and in particular of fibers, this leads to exudation of the dye, reduced rubfastness, and discoloration of materials which come into contact with the fibers. Because of this migration, conventional dyes have only limited suitability for use in the polymer matrix of polyamides. In contrast, pigments can generally be used without any difficulty relating to migration.

Materials used for black coloring of thermoplastics and specifically polyamides are usually carbon blacks (e.g. Pigment Black 7) or dyes exhibiting only a low level of migration, for example Solvent Black 7 (nigrosin) or Solvent Black 5 (nigrosin).

WO 2015/036526 describes black thermoplastic molding compositions which comprise a polymer selected from styrene copolymers, PMMA and other polyalkyl methacrylates, polycarbonates and polyester carbonates, and also a carbon black pigment.

Laser inscription for the identification of plastics moldings has assumed ever-increasing importance in recent years, because it is more cost-effective than alternative processes such as labeling. Another reason for the adoption of laser inscription is that it is a very flexible process which allows use of a very wide variety of inscription types and inscription forms, and which also allows application of various codes, for example QR codes. Laser inscription moreover provides permanent inscription of components, and therefore differs from stick-on labels in that there is no risk of unintended peeling.

One of the main applications of laser inscriptions is application of pale-colored inscriptions on a dark or black background. Additives that have proven successful for this type of inscription bring about local foaming of the polymer matrix through absorption of laser energy.

An additive that is in particular widely used for this purpose is carbon black as described by way of example in EP-A-0-053-256 or WO 94/12352. This permits cost-effective application of a pale-colored, slightly brownish inscription on a black background.

Carbon black is likewise widely used as universal additive for black coloration of, and also for laser inscription of, polyamides. However, carbon-black-colored polyamides usually have the disadvantage that their surface is rough and that its black color is not particularly intense, and that flow behavior during processing in the injection-molding process is not particularly good.

Carbon blacks generally exhibit good properties in the coloring of thermoplastics such as polyamides. However, when used in semicrystalline polymers, they act as nucleating agent, i.e. when incorporated into the molten polymer they increase the number of nuclei and thus influence crystallization behavior. Use of carbon blacks in semicrystalline polyamides leads to undesired changes in the dimensional behavior of the parts produced from the polyamide. This is in particular problematic in uses requiring high dimensional stability, e.g. in the automobile sector for frame parts, covering elements, etc.

Many application sectors for black-colored polyamides require products with high-gloss surfaces, because these are by way of example preferred by consumers for aesthetic reasons. Use of carbon black leads to scattering of the light incident on the colored plastics surface and thus to reduced gloss. The scattering of the light also makes the color appear paler, and carbon black cannot therefore be used for production of intensely black moldings.

Use of the organic dye nigrosin (Solvent Black 7—CAS: 8005-02-5) has proven to be a successful alternative to coloring with carbon black, because this can give intensely black, smooth surfaces together with good flow behavior of the compounded polyamide material in question. Coloration with nigrosin has the disadvantage that laser inscribability is adversely affected by very poor contrast.

Nigrosin is a mixture of synthetic black colorants, and is obtained via heating of nitrobenzene, aniline and aniline hydrochloride in the presence of an iron catalyst or copper catalyst. Nigrosins are available in various embodiments (water-soluble, alcohol-soluble and oil-soluble). A typical water-soluble nigrosin is Acid Black 2 (C.I. 50420), a typical alcohol-soluble nigrosin is Solvent Black 5 (C.I. 50415), and a typical oil-soluble nigrosin is Solvent Black 7 (C.I. 50415: 1).

However, nigrosin is not entirely free from concerns relating to possible health hazards: by way of example, residues of aniline and nitrobenzene from the production process can remain within the product, and there is the risk that undesired decomposition products will be produced during subsequent processing by means of extrusion processes or injection-molding processes or spinning processes.

Although combinations of carbon black and nigrosin can give relatively good surface quality and flowability, these properties are overall poorer than those of variants that use only nigrosin. This is also true for laser inscribability, because although a combination of carbon black and nigrosin permits inscription of appropriate components, the contrast values thus achievable are low.

EP-A-0-675-168 describes the use of carbon black in combination with other organic dyes. However, the description in that document relates only to variously colored inscriptions, while no details of the surface quality and flow properties of the compounded materials are provided.

The present invention is based on the object of providing novel black-colored polyamide compositions which have not only good laser inscribability with high contrast but also good surface quality and good flow properties. Another intention is to avoid the abovementioned disadvantages of the colorants used hitherto.

In the context of this invention it has now been found that use of a combination of carbon black and the organic dye Solvent Black 28 (CAS: 12237-23-9) can produce compounded polyamide materials which have not only good laser inscribability with high contrast but also good surface quality and good flow properties.

It has been found that said object is achieved when the chromium complex dye known as Solvent Black 28 is used for the coloring of polyamide compositions.

SUMMARY OF THE INVENTION

The invention firstly provides a polyamide composition comprising a) from 34.98 to 89.98% by weight of at least one synthetic polyamide as component A and b) from 0.01 to 1.0% by weight of a chromium complex dye selected from the compounds of the formulae A1), A2) and A3) and mixtures of two or three of these compounds

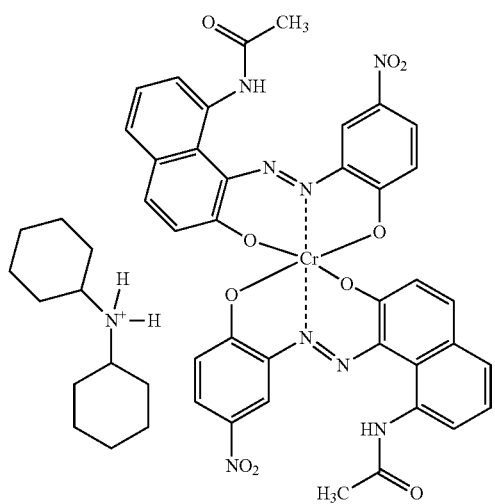
(A1)

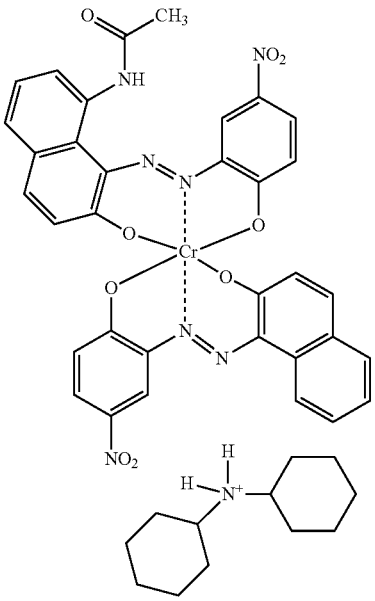
(A2)

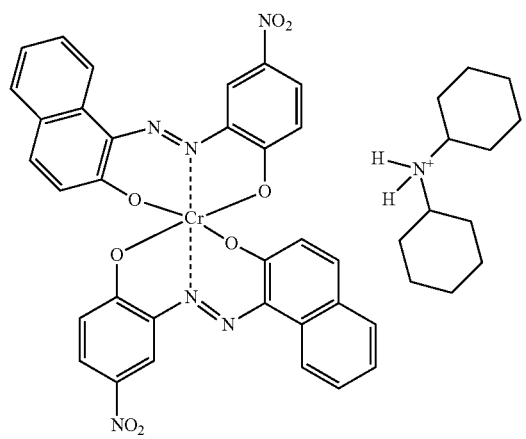
(A3)

as component B, c) from 0.01 to 1% by weight of carbon black as component C, d) from 10 to 65% by weight of glass fibers as component D, e) from 0 to 50% by weight of other additional substances as component E, where the quantities stated, which give a total of 100% by weight, are based on the entire composition and the composition comprises at most 0.05% by weight of nigrosin.

The invention further provides the use of a polyamide composition as defined above and hereinafter for the production of black-colored polyamide moldings with high heat resistance and good laser inscribability.

The invention further provides a molding produced from a polyamide molding composition of the invention, as defined above and hereinafter.

The invention further provides a process for the production of a polyamide composition as defined above and hereinafter, where at least one synthetic polyamide A, at least one chromium complex dye B, carbon black C and optionally other additives are mixed with heating to a temperature in the range from 160 to 340° C.

The polyamide composition of the invention is particularly suitable for the production of laser-inscribable moldings.

DESCRIPTION OF THE INVENTION

The invention has the following advantages:

- The chromium complex dye used in the invention in essence does not act as nucleating agent, and does not therefore lead to any relevant alteration of the crystallization behavior of the polyamide colored therewith. It is thus possible to avoid undesired alterations in the dimensional behavior of the moldings produced from the colored polyamides.
- The chromium complex dye used in the invention moreover exhibits no undesired migration in semicrystalline polyamides. Features of fibers based on the polyamide composition of the invention are little exudation and high rubfastness.
- In comparison with, for example, nigrosin, the chromium complex dye used in the invention gives rise to significantly fewer toxicological concerns.
- Features of the polyamides colored in the invention and of moldings and fibers produced therefrom are very good colorfastness, very good heat resistance and/or very good processability. In particular, it is surprising here that the polyamides colored with Solvent Black 28 have high heat resistance. In contrast, the heat resistance exhibited by Solvent Black 28 in an experiment relating to bulk coloration of polyethylene was completely inadequate, rendering processing impossible at temperatures as low as 160° C.
- Products with high-gloss surfaces can be produced with the chromium complex dye used in the invention. It is moreover also possible to produce intensely black polyamide products.
- When the chromium complex dye used in the invention is combined with carbon black in the quantities according to the claims, good laser inscribability is obtained with polyamide molding compositions, because it is in particular possible to obtain high contrast and a pale-colored typeface in black-colored moldings. These effects are particularly advantageously apparent in PA 6 and PA 66, in particular in PA 66.
- The combination of the chromium complex dye with carbon black causes no, or only insignificant, impairment of the mechanical properties of the polyamide moldings.
- The materials are laser-inscribable even with high contents of glass fibers as fillers.
- When the combination of the invention, chromium complex dye with carbon black, is used, concomitant use of nigrosin is not necessary.

The compositions comprise only very small quantities of nigrosin, at most 0.05% by weight, preferably at most 0.03% by weight, in particular 0.01% by weight. The compositions particularly preferably comprise no nigrosin.

The individual components of the compositions of the invention are explained in more detail hereinafter.

The quantities stated hereinafter are based on the entire composition. They give a total of 100% by weight. Irrespective of the manner in which the individual quantities are presented in the text, they are to be interpreted as stated precisely to two decimal places. 15% by weight therefore means 15.00% by weight.

Component A

The compositions comprise, as component A, from 34.98 to 89.98% by weight, preferably from 34.94 to 89.94% by weight, in particular from 34.9 to 89.9% by weight, of at least one synthetic polyamide.

Synthetic Polyamide of Component A

The polyamide composition of the invention comprises, as component A, at least one synthetic polyamide. For the purposes of the invention, the expression "synthetic polyamide" is interpreted widely. It encompasses in very general terms polymers which incorporate at least one component suitable for polyamide formation selected from dicarboxylic acids, diamines, salts made of at least one dicarboxylic acid and of at least one diamine, lactams, ω-amino acids, nitriles of aminocarboxylic acids and mixtures thereof. The synthetic polyamides of the invention can comprise not only the components suitable for polyamide formation but also, in copolymerized form, monomers copolymerizable therewith. The expression "synthetic polyamide" excludes natural polyamides, for example peptides and proteins, by way of example hair, wool, silk and egg white.

In the context of the invention, abbreviations conventional in the art, composed of the letters PA followed by numerals and letters, are sometimes used for the polyamides. Some of these abbreviations are standardized in DIN EN ISO 1043-1. Polyamides which can be derived from aminocarboxylic acids of the type $H_2N-(CH_2)_x-COOH$ or from the corresponding lactams are characterized as PA Z, where Z is the number of carbon atoms in the monomer: by way of example, PA 6 is used for the polymer made of ε-caprolactam or of ω-aminocaproic acid. PA Z1Z2 is used to characterize polyamides which can derived from diamines and dicarboxylic acids of the types $H_2N-(CH_2)_x-NH_2$ and $HOOC-(CH_2)_y-COOH$, where Z1 is the number of carbon atoms in the diamine and Z2 is the number of carbon atoms in the dicarboxylic acid. For copolyamides, the components are listed in the sequence of their quantitative proportions, separated by obliques: by way of example, PA 66/610 is the copolyamide made of hexamethylenediamine, adipic acid and sebacic acid. The following letter abbreviations are used for the monomers used in the invention having an aromatic or cycloaliphatic group:

T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

The expression "$C_1$-$C_4$-alkyl" hereinafter encompasses unsubstituted, straight-chain and branched $C_1$-$C_4$-alkyl groups. Examples of $C_1$-$C_4$-alkyl groups are in particular methyl, ethyl, propyl, isopropyl, n-butyl, isobutyl, sec-butyl, tert-butyl (1,1-dimethylethyl).

In the case of the aliphatic dicarboxylic acids, cycloaliphatic dicarboxylic acids, aromatic dicarboxylic acids and monocarboxylic acids mentioned hereinafter, the carboxy groups can respectively be present in non-derivatized form or in the form of derivatives. In the case of dicarboxylic acids, the number of carboxy groups present in the form of a derivative can be zero, one or two. Suitable derivatives are anhydrides, esters, acyl chlorides, nitriles and isocyanates. Preferred derivatives are anhydrides or esters. Anhydrides of dicarboxylic acids can be in monomeric or polymeric form. Preferred esters are alkyl esters and vinyl esters, particularly $C_1$-$C_4$-alkyl esters, in particular the methyl esters or ethyl esters. Dicarboxylic acids are preferably present in the form of mono- or dialkyl esters, particularly mono- or di-$C_1$-$C_4$-alkyl esters, in particular monomethyl esters, dimethyl esters, monoethyl esters or dyethyl esters. It is further preferable that dicarboxylic acids are present in the form of mono- or divinyl esters. It is further preferable that dicarboxylic acids are present in the form of mixed esters, particularly mixed esters having different $C_1$-$C_4$-alkyl components, in particular methyl ethyl esters.

The components suitable for polyamide formation are preferably selected from
pA) unsubstituted or substituted aromatic dicarboxylic acids and derivatives of unsubstituted or substituted aromatic dicarboxylic acids,
pB) unsubstituted or substituted aromatic diamines,
pC) aliphatic or cycloaliphatic dicarboxylic acids,
pD) aliphatic or cycloaliphatic diamines,
pE) monocarboxylic acids,
pF) monoamines,
pG) at least trifunctional amines,
pH) lactams,
pI) ω-amino acids,
pK) compounds different from pA) to pI), but cocondensible therewith.

Aliphatic polyamides are one suitable embodiment. For aliphatic polyamides of the type PA Z1Z2 (for example PA 66), the proviso is that at least one of components pC) or pD) must be present and neither of components pA) and pB) is permitted to be present. For aliphatic polyamides of the type PAZ (for example PA 6 or PA 12), the proviso is that at least component pH) must be present.

Semiaromatic polyamides are another suitable embodiment. For semiaromatic polyamides, the proviso is that at least one of components pA) and pB) and at least one of components pC) and pD) must be present.

The aromatic dicarboxylic acids pA) are preferably selected from respectively unsubstituted or substituted phthalic acid, terephthalic acid, isophthalic acid, naphthalenedicarboxylic acids and diphenyldicarboxylic acids, and the derivatives and mixtures of the abovementioned aromatic dicarboxylic acids.

Substituted aromatic dicarboxylic acids pA) preferably have at least one (for example 1, 2, 3 or 4) $C_1$-$C_4$-alkyl moiety. In particular, substituted aromatic dicarboxylic acids pA) have 1 or 2 $C_1$-$C_4$-alkyl moieties. These are preferably selected from methyl, ethyl, n-propyl, isopropyl, n-butyl, isobutyl, sec-butyl and tert-butyl, particularly methyl, ethyl and n-butyl, in particular methyl and ethyl, and specifically methyl. Substituted aromatic dicarboxylic acids pA) can also bear other functional groups which do not interfere with amidation, an example being 5-sulfoisophthalic acid and its salts and derivatives. A preferred example here is the sodium salt of dimethyl 5-sulfoisophthalic acid.

It is preferable that the aromatic dicarboxylic acid pA) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

It is particularly preferable to use, as aromatic dicarboxylic acid pA), terephthalic acid, isophthalic acid or a mixture of terephthalic acid and isophthalic acid.

The proportion of aromatic dicarboxylic acids in all of the dicarboxylic acids in the semiaromatic polyamides is preferably at least 50 mol %, particularly preferably from 70 mol % to 100 mol %. In one specific embodiment, the proportion of terephthalic acid or isophthalic acid, or of a mixture of terephthalic acid and isophthalic acid, based on all of the dicarboxylic acids in the semiaromatic polyamides, is at least 50 mol %, preferably from 70 mol % to 100 mol %.

The aromatic diamines pB) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane and mixtures thereof.

The aliphatic or cycloaliphatic dicarboxylic acids pC) are preferably selected from oxalic acid, malonic acid, succinic acid, glutaric acid, adipic acid, pimelic acid, suberic acid, azelaic acid, sebacic acid, undecane-am-dicarboxylic acid, dodecane-α,ω-dicarboxylic acid, maleic acid, fumaric acid, itaconic acid, cis- and trans-cyclohexane-1,2-dicarboxylic acid, cis- and transcyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines pD) are preferably selected from ethylene diamine, propylene diamine, tetramethylenediamine, heptamethylenediamine, hexamethylenediamine, pentamethylenediamine, octamethylenediamine, nonamethylenediamine, decamethylenediamine, unedecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'diaminodicyclohexylmethane and mixtures thereof.

The diamine pD) is particularly preferably selected from hexamethylenediamine, 2-methylpentamethylenediamine, octamethylenediamine, nonamethylenediamine, 2-methyl-1,8-octamethylenediamine, decamethylenediamine, undecamethylenediamine, dodecamethylenediamine, bis(4-aminocyclohexyl)methane, 3,3'-dimethyl-4,4'diaminodicyclohexylmethane and mixtures thereof.

In one specific embodiment, the semiaromatic polyamides comprise, in copolymerized form, at least one diamine pD) selected from hexamethylenediamine, bis(4-aminocyclohexyl)methane (PACM), 3,3'-dimethyl-4,4'diaminodicyclohexylmethane (MACM), isophoronediamine (IPDA) and mixtures thereof.

In one specific embodiment, the semiaromatic polyamides comprise, in copolymerized form, exclusively hexamethylenediamine as diamine pD).

In another specific embodiment, the semiaromatic polyamides comprise, in copolymerized form, exclusively bis(4-aminocyclohexyl)methane as diamine pD).

In another specific embodiment, the semiaromatic polyamides comprise, in copolymerized form, exclusively 3,3'-dimethyl-4,4'diaminodicyclohexylmethane (MACM) as diamine pD).

In another specific embodiment, the semiaromatic polyamides comprise, in copolymerized form, exclusively isophoronediamine (IPDA) as diamine pD).

The aliphatic and semiaromatic polyamides can comprise, in copolymerized form, at least one monocarboxylic acid pE). The monocarboxylic acids pE) here serve for the end-capping of the polyamides produced in the invention. In principle, any of the monocarboxylic acids capable of reaction with at least a portion of the available amino groups under the reaction conditions of polyamide condensation is suitable. Suitable monocarboxylic acids pE) are aliphatic monocarboxylic acids, alicyclic monocarboxylic acids and aromatic monocarboxylic acids. Among these are acetic acid, propionic acid, n-, iso- or tert-butanoic acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids derived from soy, linseed, castor and sunflower, acrylic acid, methacrylic acid, Versatic® acids, Koch® acids and mixtures thereof.

If unsaturated carboxylic acids or derivatives thereof are used as monocarboxylic acids pE), it can be advisable to operate in the presence of commercially available polymerization inhibitors.

The monocarboxylic acid pE) is particularly preferably selected from acetic acid, propionic acid, benzoic acid and mixtures thereof.

In one specific embodiment, the aliphatic and semiaromatic polyamides comprise, in copolymerized form, exclusively propionic acid as monocarboxylic acid pE).

In another specific embodiment, the aliphatic and semiaromatic polyamides comprise, in copolymerized form, exclusively benzoic acid as monocarboxylic acid pE).

In another specific embodiment, the aliphatic and semiaromatic polyamides comprise, in copolymerized form, exclusively acetic acid as monocarboxylic acid pE).

The aliphatic and semiaromatic polyamides can comprise, in copolymerized form, at least one monoamine pF). The aliphatic polyamides here comprise, in copolymerized form, only aliphatic monoamines or alicyclic monoamines. The monoamines pF) here serve for the end-capping of the polyamides produced in the invention. In principle, any of the monoamines capable of reaction with at least some of the available carboxylic acid groups under the reaction conditions of polyamide condensation is suitable. Suitable monoamines pF) are aliphatic monoamines, alicyclic monoamines and aromatic monoamines. Among these are methylamine, ethylamine, propylamine, butylamine, hexylamine, heptylamine, octylamine, decylamine, stearylamine, dimethylamine, dyethylamine, dipropylamine, dibutylamine, cyclohexylamine, dicyclohexylamine, aniline, toluidine, diphenylamine, naphthylamine and mixtures thereof.

It is also possible to use at least one, at least trifunctional amine pG) for the production of the aliphatic and semiaromatic polyamides. Among these are N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. It is preferable to avoid use of any at least trivalent amines pG).

Suitable lactams pH) are ε-caprolactam, 2-piperidone (δ-valerolactam), 2-pyrrolidone (γ-butyrolactam), caprylolactam, enantholactam, laurolactam and mixtures thereof.

Suitable ω-amino acids pI) are 6-aminocaproic acid, 7-aminoheptanoic acid, 11-aminoundecanoic acid, 12-aminododecanoic acid and mixtures thereof.

Suitable compounds pK) differing from pA) to pI) but concondensable therewith are at least trifunctional carboxylic acids, diaminocarboxylic acids, etc.

Suitable compounds pK) are moreover 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethyl-cyclohexyl)methyl]-C-hydroxycarbonimidoyl]benzoic acid, 3-[(Z)—N-[(5-amino-1,3,3-trimethyl-cyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

The polyamide A is preferably selected from
PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912,
PA 1212, PA 6.T, PA 9.T, PA 8.T, PA 10.T, PA 12.T,
PA 6.I, PA 8.I, PA 9.I, PA 10.I, PA 12.I, PA 6.T/6, PA 6.T/10, PA 6.T/12,
PA 6.T/6.I, PA 6.T/8.T, PA 6.T/9.T, PA 6.T/10T, PA 6.T/12.T, PA 12.T/6.T,
PA 6.T/6.I/6, PA 6.T/6.I/12, PA 6.T/6.I/6.10, PA 6.T/6.I/6.12, PA 6.T/6.6,
PA 6.T/6.10, PA 6.T/6.12, PA 10.T/6, PA 10.T/11, PA 10.T/12, PA 8.T/6.T,
PA 8.T/66, PA 8.T/8.I, PA 8.T/8.6, PA 8.T/6.I, PA 10.T/6.T, PA 10.T/6.6,
PA 10.T/10.I, PA 10T/10.I/6.T, PA 10.T/6.I, PA 4.T/4.I/46, PA 4.T/4.I/6.6,
PA 5.T/5.I, PA 5.T/5.I/5.6, PA 5.T/5.I/6.6, PA 6.T/6.I/6.6, PA MXDA.6,
PA IPDA.I, PA IPDA.T, PA MACM.I, PA MACM.T, PA PACM.I, PA PACM.T,
PA MXDA.I, PA MXDA.T, PA 6.T/IPDA.T, PA 6.T/MACM.T, PA 6.T/PACM.T,
PA 6.T/MXDA.T, PA 6.T/6.I/8.T/8.I, PA 6.T/6.I/10.T/10.I,
PA 6.T/6.I/IPDA.T/IPDA.I, PA 6.T/6.I/MXDA.T/MXDA.I,
PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T,
PA 10.T/IPDA.T, PA 12.T/IPDA.T and copolymers and mixtures thereof.

In one preferred embodiment, the polyamide composition of the invention comprises at least one aliphatic polyamide as component A.

The polyamide is then preferably selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1212, and copolymers and mixtures thereof.

In particular, the aliphatic polyamide A is selected from PA 6, PA 66, PA 666 and PA 12. One specific embodiment is provided by polyamide compositions where component A comprises PA 66 or consists of PA 66.

In another preferred embodiment, the process of the invention serves for the production of a semiaromatic polyamide.

The polyamide A is then preferably selected from PA 6.T, PA 9.T,
PA 10.T, PA 12.T, PA 6.I, PA 9.I, PA 10.I, PA 12.I, PA 6.T/6.I, PA 6.T/6, PA 6.T/8.T,
PA 6.T/10T, PA 10.T/6.T, PA 6.T/12.T, PA 12.T/6.T, PA IPDA.I, PA IPDA.T,
PA 6.T/IPDA.T, PA 6.T/6.I/IPDA.T/IPDA.I, PA 6.T/10.T/IPDA.T,

PA 6.T/12.T/IPDA.T, PA 6.T/10.T/PACM.T, PA 6.T/12.T/PACM.T, PA 10.T/IPDA.T,

PA 12.T/IPDA.T and copolymers and mixtures thereof.

In the context of this invention, the statements hereinafter relating to number-average molar mass $M_n$ and to weight-average molar mass $M_w$ are based on determination by means of gel permeation chromatography (GPC). By way of example, PMMA was used as polymer standard with low polydispersity for calibration.

The number-average molar mass $M_n$ of the synthetic polyamide A is preferably in the range from 8000 to 50000 g/mol, particularly preferably from 10000 to 35000 g/mol.

The weight-average molar mass $M_n$ of the synthetic polyamide A is preferably in the range from 15000 to 200000 g/mol, particularly preferably from 20000 to 125000 g/mol.

The polydispersity PD ($=M_w/M_n$) of the polyamides A is preferably at most 6, particularly preferably at most 5, in particular at most 3.5.

Component B

The chromium complex dye B used in the invention is obtainable as Solvent Black 28 (CAS No.: 12237-23-9, C.I. Solvent Black 28). A product available commercially is Oracet Black 045 from BASF SE. Solvent Black 28 is almost insoluble in water, but has good solubility in alcoholic organic solvents or in organic solvents comprising ketone groups. At 20° C., solubility in ethanol is about 10 g/L and in methyl ethyl ketone is about 400 g/L.

It is preferable that the polyamide composition of the invention comprises a quantity of from 0.0003% by weight to 0.5% by weight of the chromium complex dye B, particularly from 0.05% by weight to 0.3% by weight, based on the total weight of the polyamide composition.

Component C

The compositions of the invention comprise, as component C, from 0.01 to 1% by weight of carbon black, preferably from 0.03 to 0.5% by weight, in particular from 0.05 to 0.3% by weight. Carbon black, also termed industrial carbon black, is a form of carbon with high surface-to-volume ratio, and is composed of from 80 to 99.5% by weight of carbon. The specific surface area of industrial carbon black is about 10 to 1500 m$^2$/g (BET). The carbon black can be gas black, furnace black, lamp black, thermal black or acetylene black. Grain diameter is in the range from 8 to 500 nm, typically from 8 to 110 nm. Other terms used for carbon black are Pigment Black 7 and Lamp Black 6. Pigment blacks are nanoparticulate carbon blacks which by virtue of their fineness increasingly lose the brown underlying hue of conventional carbon blacks.

Component D

The composition of the invention comprises, as component D, from 10 to 65% by weight of glass fibers, e.g. from 15 to 55% by weight or from 20 to 50% by weight of glass fibers (where the quantity of component A in these examples is adjusted appropriately).

Specifically, chopped glass fibers are used. In particular, component D comprises glass fibers which are preferably short fibers. The length of these is preferably in the range from 2 to 50 mm, and their diameter is preferably from 5 to 40 µm. It is alternatively possible to use continuous-filament fibers (rovings). Fibers with circular and/or non-circular cross section are suitable, and in the latter case here the dimensional ratio of the major cross-sectional axis to the minor cross-sectional axis is in particular >2, preferably in the range from 2 to 8 and particularly preferably in the range from 3 to 5.

In one specific embodiment, component D comprises what are known as "flat glass fibers". These specifically have an oval or elliptical cross section, or an elliptical cross section with narrowed area(s) ("cocoon" fiber), or a rectangular or almost rectangular cross section. It is preferable here to use glass fibers with non-circular cross section and with a dimensional ratio of major cross-sectional axis to minor cross-sectional axis of more than 2, preferably from 2 to 8, in particular from 3 to 5.

It is also possible to use mixtures of glass fibers with circular and non-circular cross section to reinforce the molding compositions of the invention. In one specific embodiment, the content of flat glass fibers as defined above predominates, i.e. these make up more than 50% by weight of the total composition of the fibers.

If glass fiber rovings are used as component D, the diameter of these is preferably from 10 to 20 µm, with preference from 12 to 18 µm. The cross section of the glass fibers here can be round, oval, elliptical, almost rectangular or rectangular. It is particularly preferable to use what are known as flat glass fibers with a ratio of the cross-sectional axes of from 2 to 5. In particular, E glass fibers are used. However, it is also possible to use any of the other types of glass fiber, for example A, C, D, M, S, or R glass fibers, or any desired mixture thereof, or a mixture with E glass fibers.

The polyamide molding compositions of the invention can be produced by the known processes for the production of elongate long-fiber-reinforced pellets, in particular by pultrusion processes, where the continuous-filament fiber strand (roving) is completely saturated with the polymer melt and then is cooled and chopped. The elongate long-fiber-reinforced pellets thus obtained, the pellet length of which is preferably from 3 to 25 mm, in particular from 4 to 12 mm, can be further processed by the conventional processing methods, e.g. injection molding or compression molding, to give moldings.

Component E

The compositions of the invention comprise, as component E, from 0 to 50% by weight of other additional substances, preferably from 0 to 30% by weight, in particular from 0 to 10% by weight. When these additional substances are concomitantly used, the minimal quantity is 0.1% by weight, preferably 1% by weight, in particular 3% by weight.

When component E is concomitantly used, the upper limit for component A decreases correspondingly. In the case of a minimal quantity of 0.1% by weight of component E therefore, by way of example, the upper limit for the quantity of component A is 89.88% by weight.

Materials that can be used as other additional substances are fillers and reinforcing materials other than glass fibers, thermoplastic polymers other than component A, or other additives.

In the context of the invention, the expression "filler and reinforcing material" (=possible component E) is interpreted widely and comprises particulate fillers, fiber materials and any desired transitional forms. Particulate fillers can have a wide range of particle sizes, extending from particles in the form of dusts to coarse-grained particles. Filler material used can comprise organic or inorganic fillers and reinforcing materials. Examples of materials that can be used are inorganic fillers, for example kaolin, chalk, wollastonite, talc powder, calcium carbonate, silicates, titanium dioxide, zinc oxide, graphite, glass particles, e.g. glass beads, nanoscale fillers, for example carbon nanotubes, nanoscale phyllosilicates, nanoscale aluminum oxide ($Al_2O_3$), nanoscale titanium dioxide ($TiO_2$), graphene, permanently magnetic or magnetizable metal compounds and/or alloys, phyllosilicates and nanoscale silicon dioxide ($SiO_2$). The fillers can also be surface-treated fillers.

Phyllosilicates that can be used in the molding compositions of the invention are by way of example kaolins, serpentines, talc powder, micas, vermiculites, illites, smectites, montmorillonite, hectorite, double hydroxides or a mixture thereof. The phyllosilicates can be surface-treated or non-surface-treated phyllosilicates.

It is moreover possible to use one or more fiber materials. These are preferably selected from known inorganic reinforcement fibers, for example boron fibers, carbon fibers, silica fibers, ceramic fibers and basalt fibers; organic reinforcement fibers, for example aramid fibers, polyester fibers, nylon fibers, polyethylene fibers, and natural fibers, for example wood fibers, flax fibers, hemp fibers and sisal fibers.

In particular, it is preferable to use carbon fibers, aramid fibers, boron fibers, metal fibers or potassium titanate fibers.

The thermoplastic polymers other than component A are preferably selected from
- homo- or copolymers which comprise, in copolymerized form, at least one monomer selected from $C_2$-$C_{10}$ monoolefins, for example ethylene or propylene, 1,3-butadyene, 2-chloro-1,3-butadyene, vinyl alcohol and its $C_2$-$C_{10}$-alkyl esters, vinyl chloride, vinylidene chloride, vinylidene fluoride, tetrafluoroethylene, glycidyl acrylate, glycidyl methacrylate, acrylates and methacrylates having alcohol components of branched and unbranched $C_1$-$C_{10}$-alcohols, vinyl aromatics, for example styrene, acrylonitrile, methacrylonitrile, α,β-ethylenically unsaturated mono- and dicarboxylic acids, and maleic anhydride;
- homo- and copolymers of vinyl acetals;
- polyvinyl esters;
- polycarbonates (PC);
- polyesters, for example polyalkylene terephthalates, polyhydroxyalkanoates (PHA), polybutylene succinates (PBS), polybutylene succinate adipates (PBSA);
- polyethers;
- polyetherketones;
- thermoplastic polyurethanes (TPU);
- polysulfides;
- polysulfones;
- polyether sulfones;
- cellulose alkyl esters;
- and mixtures thereof.

Mention may be made by way of example of polyacrylates having identical or different alcohol moieties from the group of the $C_4$-$C_8$-alcohols, particularly of butanol, hexanol, octanol and 2-ethylhexanol, polymethyl methacrylate (PMMA), methyl methacrylatebutyl acrylate copolymers, acrylonitrile-butadyene-styrene copolymers (ABS), ethylene-propylene copolymers, ethylene-propylene-dyene copolymers (EPDM), polystyrene, (PS), styrene-acrylonitrile copolymers (SAN), acrylonitrile-styrene-acrylate (ASA), styrene-butadyene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutanoic acid (PHB), polyhydroxyvaleric acid (PHV), polylactic acid (PLA), ethylcellulose (EC), cellulose acetate (CA), cellulose propionate (CP) and cellulose acetate/butyrate (CAB).

It is preferable that the at least one thermoplastic polymer comprised in the molding composition of the invention is polyvinyl chloride (PVC), polyvinyl butyral (PVB), homo- or copolymer of vinyl acetate, homo- or copolymer of styrene, polyacrylate, thermoplastic polyurethane (TPU) or polysulfide.

It can be advantageous to combine the Solvent Black 28 with at least one further colorant (=component E). Component E is then preferably selected from non-nucleating colorants other than B and C. Among these are non-nucleating dyes, non-nucleating pigments and mixtures thereof. Examples of non-nucleating dyes are Solvent Yellow 21 (obtainable commercially as Oracet® Yellow 160 FA from BASF SE) and Solvent Blue 104 (obtainable commercially as Solvaperm® Blue 2B from Clariant). Examples of non-nucleating pigments are Pigment Brown 24 (obtainable commercially as Sicotan® Yellow K 2011 FG from BASF SE). Small quantities of at least one white pigment can also be used as component E. Suitable white pigments are titanium dioxide (Pigment White 6), barium sulfate (Pigment White 22), zinc sulfide (Pigment White 7), etc. In one specific embodiment, the molding composition of the invention comprises, as component E, from 0.001 to 0.5% by weight of at least one white pigment. By way of example, the molding composition can comprise 0.05% by weight of titanium dioxide with trademark Kronos 2220 from Kronos.

The nature and quantity of the addition depends on the hue, i.e. on the precise black hue desired. By way of example, Solvent Yellow 21 can be used to shift the black hue from by way of example $b^*=-1.0$ in the direction of $+b^*$, i.e. in the direction of yellow, within the CIELAB color space. The expression used by the person skilled in the art for this method is shading. The measurement method used is in accordance with DIN 6174 "Colorimetric evaluation of color coordinates and color differences according to the approximately uniform CIELAB color space" or the successor standard.

The composition of the invention preferably comprises, alongside components B and C, no other black-coloring dyes or pigments. It is particularly preferable that it comprises no other dyes or coloring pigments at all.

Suitable preferred additives E are lubricants and heat stabilizers, and also flame retardants, light stabilizers (UV stabilizers, UV absorbers or UV blockers), dyes, nucleating agents, metallic pigments, metal flakes, metal-coated particles, antistatic agents, conductivity additives, mold-release agents, optical brighteners, antifoams, etc.

The molding compositions of the invention can preferably comprise, as component E, from 0.01 to 3% by weight, particularly from 0.02 to 2% by weight, in particular from 0.05 to 1.0% by weight, of at least one heat stabilizer, based on the total weight of the composition. The molding compositions of the invention can preferably comprise, as component E, lubricants and heat stabilizers in quantities of respectively from 0.05 to 1.0% by weight, based on the entire composition.

The heat stabilizers are preferably selected from copper compounds, secondary aromatic amines, sterically hindered phenols, phosphites, phosphonites and mixtures thereof.

To the extent that a copper compound is used, the quantity of copper is preferably from 0.003 to 0.5% by weight, in particular from 0.005 to 0.3% by weight and particularly preferably from 0.01 to 0.2% by weight, based on the total weight of the composition.

To the extent that stabilizers based on secondary aromatic amines are used, the quantity of these stabilizers is preferably from 0.2 to 2% by weight, particularly preferably from 0.2 to 1.5% by weight, based on the total weight of the composition.

To the extent that stabilizers based on sterically hindered phenols are used, the quantity of these stabilizers is preferably from 0.1 to 1.5% by weight, particularly preferably from 0.2 to 1% by weight, based on the total weight of the composition.

To the extent that stabilizers based on phosphites and/or phosphonites are used, the quantity of these stabilizers is preferably from 0.1 to 1.5% by weight, particularly preferably from 0.2 to 1% by weight, based on the total weight of the composition.

Examples of suitable compounds E of mono- or divalent copper are salts of mono- or divalent copper with inorganic or organic acids or with mono- or difunctional phenols, the oxides of mono- or divalent copper and the complexes of copper salts with ammonia, with amines, with amides, with lactams, with cyanides or with phosphines, preferably the Cu(I) or Cu(II) salts of hydrohalic acids or of hydrocyanic acids, or the copper salts of aliphatic carboxylic acids. The monovalent copper compounds are particularly preferably CuCl, CuBr, CuI, CuCN and $Cu_2O$, and the divalent copper compounds are particularly preferably $CuCl_2$, $CuSO_4$, CuO, copper(II) acetate or copper(II) stearate.

The copper compounds are available commercially, or production thereof is known to the person skilled in the art. The copper compound can be used per se or in the form of concentrates. The term concentrate here means a polymer, preferably of the same chemical type as component A), which comprises a high concentration of the copper salt. Use of concentrates is a conventional method and is particularly frequently used when metering of very small quantities of an input material is required. The copper compounds are advantageously used in combination with other metal halides, in particular alkali metal halides, for example NaI, KI, NaBr, KBr, where the molar ratio of metal halide to copper halide is from 0.5 to 20, preferably from 1 to 10 and particularly preferably from 3 to 7.

Particularly preferred examples of stabilizers that can be used in the invention, based on secondary aromatic amines, are adducts derived from phenylenediamine with acetone (Naugard® A), adducts derived from phenylenediamine with linolenic acid, 4,4'-bis(α,α-dimethylbenzyl)diphenylamine (Naugard® 445), N,N'-dinaphthyl-p-phenylenediamine, N-phenyl-N'-cyclohexyl-p-phenylenediamine and mixtures of two or more thereof.

Preferred examples of stabilizers that can be used in the invention based on sterically hindered phenols are N,N'-hexamethylenebis-3-(3,5-di-tert-butyl-4-hydroxyphenyl) propionamide, glycol bis(3,3-bis(4'-hydroxy-3'-tert-butylphenyl)butanoate), 2,1'-thioethyl bis(3-(3,5-di-tert-butyl-4-hydroxyphenyl)propionate, 4,4'-butylidenebis(3-methyl-6-tert-butylphenol), triethylene glycol 3-(3-tert-butyl-4-hydroxy-5-methylphenyl)propionate and mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris-(tert-butylphenyl)) pentaerythritol diphosphite, tristearyl sorbitol triphosphite, tetrakis(2,4-di-tert-butylphenyl) 4,4'-biphenylene diphosphonite, 6-isooctylm-2,4,8,10-tetra-tert-butyl-12H-dibenzo[d,g]-1,3,2-dioxaphosphocine, 6-fluoro-2,4,8,10-tetra-tert-butyl-12-methyl-dibenz[d,g]-1,3,2-dioxaphosphocine, bis (2,4-di-tert-butyl-6-methylphenyl) methyl phosphite and bis (2,4-di-tert-butyl-6-methylphenyl) ethyl phosphite. Preference is given in particular to tris[2-tert-butyl-4-thio (2'-methyl-4'-hydroxy-5'-tert-butyl)-phenyl-5-methyl]phenyl phosphite and tris(2,4-di-tert-butylphenyl) phosphite (Hostanox® PAR24: product commercially available from BASF SE).

One preferred embodiment of the heat stabilizer consists in the combination of organic heat stabilizers (in particular Hostanox PAR 24 and Irganox 1010), a bisphenol-A-based epoxide (in particular Epikote 1001) and a copper stabilizer system based on CuI and KI. An example of a stabilizer mixture obtainable commercially, composed of organic stabilizers and epoxides, is Irgatec® NC66 from BASF SE. In particular, preference is given to a heat stabilizer system based exclusively on CuI and KI. The use of other transition metal compounds, in particular metal salts or metal oxides of group VB, VIB, VIIB or VIIIB of the periodic table of the elements, alongside addition of copper or copper compounds, is excluded. It is moreover preferable that no transition metals of group VB, VIB, VIIB or VIIIB of the periodic table of the elements, for example iron powder or steel powder, are added to the molding composition of the invention.

The molding compositions of the invention preferably comprise from 0 to 30% by weight, particularly from 0 to 20% by weight, based on the total weight of the composition, of at least one flame retardant as additive E. If the molding compositions of the invention comprise at least one flame retardant, the quantity thereof is preferably from 0.01 to 30% by weight, particularly preferably from 0.1 to 20% by weight, based on the total weight of the composition. Flame retardants that can be used are halogen-containing and halogen-free flame retardants and synergists thereof (see also Gächter/Müller, 3rd edn., 1989, Hanser Verlag, chapter 11). Preferred halogen-free flame retardants are red phosphorus, salts of phosphinic acid or of diphosphinic acid, and/or nitrogen-containing flame retardants such as melamine, melamine cyanurate, melamine sulfate, melamine borate, melamine oxalate, melamine phosphate (prim., sec.) or sec. melamine pyrophosphate, melamine neopentyl glycol borate, guanidine, and the derivatives thereof known to the person skilled in the art, and also polymeric melamine phosphate (CAS No.: 56386-64-2 and 218768-84-4 and EP-A-1 095 030), ammonium polyphosphate, trishydroxyethyl isocyanurate (optionally also ammonium polyphosphate in a mixture with trishydroxyethyl isocyanurate) (EP-A-058 456 7). Other N-containing or P-containing flame retardants or PN condensates suitable as flame retardants can be found in DE-A-10 2004 049 342, as also can the conventional synergists for these, for example oxides or borates. Examples of suitable halogen-containing flame retardants are oligomeric brominated polycarbonates (BC 52 Great Lakes) and polypentabromobenzyl acrylates where N is greater than 4 (FR 1025 Dead Sea Bromine), reaction products of tetrabromobisphenol A with epoxides, bromated oligomeric or polymeric styrenes and Dechloran, these mostly being used with antimony oxides as synergists (for details and other flame retardants: see DE-A-10 2004 050 025).

Production of the polyamide molding compositions is achieved by processes known per se. This includes mixing of the components in the appropriate proportions by weight. It is preferable that the components are mixed at elevated temperatures by combining, mixing, kneading, extruding or rolling of same. The mixing temperature is preferably in the range from 220° C. to 340° C., particularly from 240 to 320° C. and specifically from 250 to 300° C. Suitable processes are known to the person skilled in the art.

Moldings

The present invention moreover provides moldings produced with use of the copolyamides and, respectively, polyamide molding compositions of the invention.

The black-colored polyamides can be used for the production of moldings by means of any desired suitable processing methods. Suitable processing methods are in particular injection molding, extrusion, coextrusion, thermoforming and any other known method for shaping of plastics. These and other examples can be found by way of example in "Einfärben von Kunststoffen" [Coloring of plastics], VDI-Verlag, ISBN 3-18-404014-3.

The polyamides obtainable by the process of the invention are moreover advantageously suitable for use for automobile applications, and for the production of moldings for electrical and electronics components, specifically including products in the high-temperature sector.

One specific embodiment is provided by moldings in the form of, or as part of, a component for the automobile sector, in particular selected from cylinder head covers, engine covers, charge-air-cooler housings, charge-air cooler flaps, intake pipes, intake manifolds, connectors, gearwheels, radiator fans, cooling-water reservoirs, heat-exchanger housings or heat-exchanger-housing parts, coolant coolers, charge-air coolers, thermostats, water pumps, heaters and fastening parts.

Possible uses in automobile interiors are for dashboards, steering column switches, seat components, headrests, center consoles, transmission components and door modules, and possible uses in automobile exteriors are for A-, B-, C- or D-column coverings, spoilers, door handles, exterior mirror components, windshield washer components, windshield washer protective housings, decorative grilles, cover strips, roof railings, window frames, sliding-roof frames, antenna cladding, front and rear lamps, engine covers, cylinder head covers, intake pipes, windshield wipers and exterior bodywork parts.

Another specific embodiment is provided by moldings per se or as part of a passive or active electrical or electronic component, of a circuit board, of a part of a circuit board, of a housing constituent, of a foil, of a connection, in particular in the form, or as part, of a switch, of a plug, of a socket, of a distributor, of a relay, of a resistor, of a capacitor, of a coil or of a coil body, of a lamp, of a diode, of an LED, of a transistor, of a connector, of a regulator, of an integrated circuit (IC), of a processor, of a controller, of a memory and/or of a sensor.

The polyamides of the invention are moreover specifically suitable for use in soldering processes under lead-free conditions (lead free soldering), for the production of plug connectors, micro-switches, micro tip switches and semiconductor components, in particular reflector housings of light-emitting diodes (LEDs).

A specific embodiment is provided by moldings in the form of fastening elements of electrical of electronic components, for example spacers, studs, strips, insertion guides, bolts and nuts.

Preference is in particular given to a molding in the form, or as part of a base element, of a plug connector, of a plug or of a socket. The molding preferably comprises functional elements requiring mechanical toughness. Examples of these functional elements are film hinges, snap hooks (snap-in) and tongue springs.

The polyamides of the invention can be used for the kitchen and household sector to produce components for kitchen equipment, e.g. fryers, smoothing irons and knobs, and also for applications in the garden and leisure sectors, examples being components for irrigation systems and garden equipment and door handles.

Production of the polyamide composition for the production of moldings is achieved by processes known per se. Reference is made here to the abovementioned process for the production of the polyamide composition. This includes mixing of the components in the appropriate proportions by weight. It is preferable that the components are mixed at elevated temperatures by combining, mixing, kneading, extruding or rolling of same. The mixing temperature is preferably in the range from 220 directly to 340° C., particularly from 240 to 320° C. and specifically from 250 to 300° C. It can be advantageous to premix individual components. It is moreover also possible to directly produce the moldings from a physical mixture (dryblend), produced significantly below the melting point of the polyamide, of premixed components and/or of individual components. The mixing temperature is then preferably from 0 to 100° C., particularly preferably from 10 to 50° C., in particular ambient temperature (25° C.). The molding compositions can be processed by conventional processes, for example by injection molding or extrusion, to give moldings. They are in particular suitable by way of example for materials for covers, housings, add-on parts and sensors, by way of example for motor vehicle applications, electrical applications, electronics applications, telecommunications applications, information technology applications, computer applications, household applications, sports applications, medical applications or entertainment applications.

The examples hereinafter serve to illustrate the invention, without in any way restricting same.

Examples

The following raw materials were used:

Nylon-6,6: Ultramid® A27 from BASF SE, melting point: 264° C., viscosity number (0.5% in 96% $H_2SO_4$): 150 $cm^3/g$ Nylon-6: Ultramid® B27 from BASF SE, melting point: 222° C., viscosity number (0.5% in 96% $H_2SO_4$): 150 $cm^3/g$ Glass fiber: 3B—DS1125, producer: 3B-FIBREGLASS S.P.R.L., average diameter: 10.5 μm, length: 4 mm Glass fiber: NEG—T249H, producer: NIPPON ELECTRIC GLASS (MALAYSIA) SDN. BHD., average diameter: 10.5 μm, length: 3 mm Nigrosin/Solvent Black 7: producer: COLLOIDS LTD.

Solvent Black 28: Oracet BK 045, producer: BASF SE

Carbon black (Special Black 4): producer: Orion Engineered Carbons GmbH

Heat stabilizer: CuI/KI in a molar ratio of 1:4

Lubricant: EBS, producer: Lonza Cologne GmbH

The ingredients stated in Table 1 below were premixed for ten minutes in a tumbling mixer and then extruded and pelletized by way of a twin-screw extruder with diameter 25 mm and L/D ratio 44 at 300° C. barrel temperature. For this, the natural-color polyamide pellets were predried in a drying oven at 100° C. for four hours to give less than 0.1% moisture content. The resultant pellets were injection-molded at a melt temperature of 300° C. to give plaques of thickness 2 mm measuring 60×60 mm, and the product was assessed visually and also by technical testing. Mechanical properties were determined in accordance with DIN ISO 527 and, respectively, 179-2/1 eU and, respectively, 179-2/1 eAf in the version valid in 2016.

TABLE 1

| Composition | Comparison 1 | Comparison 2 | Comparison 3 | Inventive ex. 1 | Comparison 4 | Comparison 5 | Comparison 6 | Inventive ex. 2 |
|---|---|---|---|---|---|---|---|---|
| PA 66 (ULT. A27) | 63.8 | 64.2 | 64.4 | 64.3 | | | | |
| PA 6 (ULT. B27) | | | | | 69.2 | 68.1 | 69 | 69 |
| Glass fiber (3B - DS1125) | 35 | 35 | 35 | 35 | | | | |
| Glass fiber (NEG - T249H) | | | | | 30 | 30 | 30 | 30 |
| Solvent Black 7 (nigrosin) | 0.76 | 0.2 | 0 | 0 | 0.3 | 0.4 | 0.2 | |
| Solvent Black 28 (Oracet BK 045) | 0 | 0 | 0 | 0.1 | 0 | 0 | 0 | 0.1 |
| Carbon black (Special Black 4) | 0 | 0.1 | 0.1 | 0.1 | 0 | 1 | 0.1 | 0.1 |
| Heat stabilizer (CuI/KI) | 0.13 | 0.13 | 0.13 | 0.13 | 0.28 | 0.28 | 0.3 | 0.3 |
| Lubricant (EBS) | 0.35 | 0.35 | 0.35 | 0.35 | 0.2 | 0.2 | 0.2 | 0.2 |

The flow spiral tests were carried out by a method internal to BASF where the material is charged by way of an injection molding machine at constant temperature and constant injection pressure to a spiral mold until the melt freezes. Flow path length can then be directly read from the resultant sample.

A Veeco NT9300 white-light interferometer was used to measure surface roughness (mean roughness value $R_a$, root-mean-square roughness value $R_q$ and mean roughness depth $R_z$). Glass was measured in accordance with DIN ISO 8254-1 with handheld micro gloss 75 equipment from BYK-Gardner GmbH, Geretsried. The highest gloss value from 20 individual measurements was used.

The laser contrast value was determined in accordance with DIN 66236. Laser inscription can by way of example be achieved with a FOBA DP50 laser, which is a diode-pumped Nd:YAG laser with wavelength 1064 nm or 532 nm. The typical laser power rating is 50 W. The luminance value can by way of example be determined with a Minolta LS-110 luminance meter. This is an SLR spot luminance tester for testing spot luminance of light sources and of surfaces. Measurement angle is ⅓° and observation angle is 9°. The optical system used is an 85 mm f/2.8 objective with SLR observer system. The scattered-light factor is less than 1.5%.

The contrast value describes the intensity difference between the brightest and darkest points of a KTE grid and of the substrate. The contrast values are calculated by using the maximal and minimal luminance values determined for inscription and substrate.

A Minolta LS-110 luminance meter was used to determine the luminance value.

Table 2 below collates the test results.

From the results it is apparent that good impact resistance together with good luminance and gloss values were determined at the same time as high laser contrast values only for the combination of the invention: Solvent Black 28 and carbon black.

TABLE 2

| | Unit | DIN | ISO | Comparison 1 | Comparison 2 | Comparison 3 | Inventive ex. 2 | Comparison 4 | Comparison 5 | Comparison 6 | Inventive ex. 2 |
|---|---|---|---|---|---|---|---|---|---|---|---|
| Product features | | | | | | | | | | | |
| Density | g/cm³ | 53479 | 1183 | 1.411 | 1.411 | 1.411 | 1.411 | 1.350 | 1.350 | 1.350 | 1.350 |
| VN (0.005 g/ml in H₂SO₄) | cm³/g | 53727 | 307 | 144 | 156 | 144 | 152 | 151 | 151 | 155 | 154 |
| Mechanical properties (dry) | | | | | | | | | | | |
| Tensile modulus of elasticity | MPa | | 527 | 11287 | 11330 | 11400 | 11405 | 9481 | 9677 | 9644 | 9421 |
| Tensile stress at break | MPa | | 527 | 208 | 208 | 190 | 199 | 182 | 178 | 178 | 171 |
| Tensile strain at break | % | | 527 | 3.0 | 3.3 | 2.6 | 3.4 | 4.2 | 3.7 | 3.7 | 3.8 |
| Charpy impact resistance | kJ/m² | | 179-2/1eU | 90 | 89 | 73 | 89 | 98 | 87 | 91 | 92 |
| Charpy notched impact resistance | kJ/m² | | 179-2/1eAf | 11.7 | 11.4 | 9.7 | 10.7 | 12.9 | 11.9 | 12.1 | 11.7 |
| Other properties | | | | | | | | | | | |
| 2 mm flow spiral (Injection pressure 100 bar) | cm | | | 78 | 69 | 71 | 70 | 75 | 66 | 64 | 67 |
| 2 mm flow spiral (Injection pressure 150 bar) | cm | | | 105 | 88 | 98 | 96 | 95 | 93 | 85 | 90 |
| Surface roughness ($R_a/R_q/R_z$) | | | | 0.8/1.8/73 | 1.2/2.2/77 | 3.0/4.2//103 | 1.4/2.5/83 | — | — | — | — |
| 75° gloss measurement | | | 8254-1 | 76.7 | 75.4 | 71.4 | 74.6 | 93.2 | 93.7 | 94.4 | 95.7 |
| (KTE) laser contrast value | | | | 3.8 | 11.8 | 19.8 | 17.5 | 7.4 | 11.4 | 19.0 | 32.3 |
| Laser contrast value | | 66236 | | 73.3 | 91.5 | 94.9 | 94.3 | 86.5 | 91.2 | 94.7 | 96.9 |

TABLE 2-continued

| | Unit | DIN | ISO | Comparison 1 | Comparison 2 | Comparison 3 | Inventive ex. 2 | Comparison 4 | Comparison 5 | Comparison 6 | Inventive ex. 2 |
|---|---|---|---|---|---|---|---|---|---|---|---|
| Luminance value (max. brightness of inscription in cd/m²) | | | | 30 | 106 | 257 | 210 | 37 | 57 | 95 | 194 |

The invention claimed is:

1. A polyamide composition comprising
    a) from 34.98 to 89.98% by weight of at least one synthetic polyamide as component A and
    b) from 0.01 to 1.0% by weight of a chromium complex dye selected from the compounds of the formulae A1), A2) and A3) and mixtures of two or three of these compounds

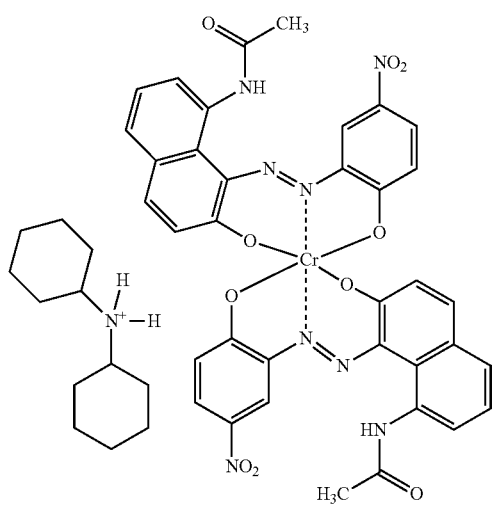

(A1)

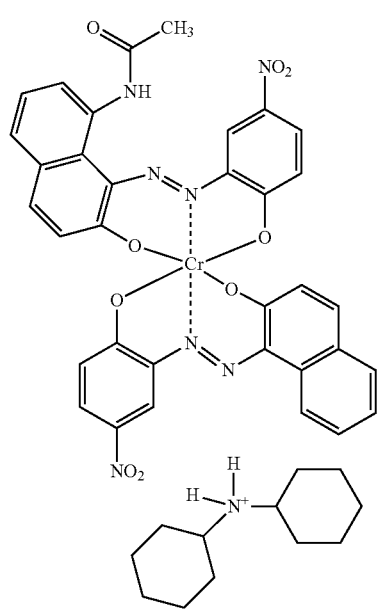

(A2)

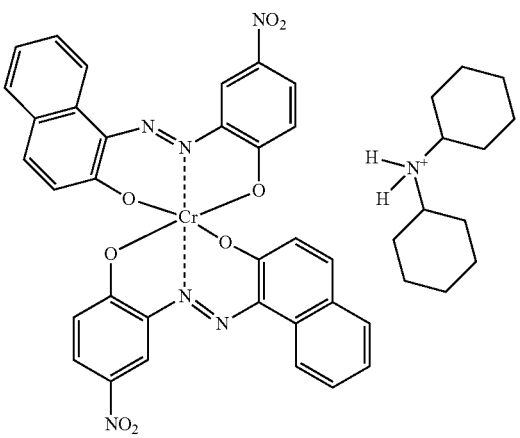

(A3)

as component B,
   c) from 0.01 to 1% by weight of carbon black as component C,
   d) from 10 to 65% by weight of glass fibers as component D,
   e) from 0 to 50% by weight of other additional substances as component E,
   where the quantities stated, which give a total of 100% by weight, are based on the entire composition and the composition comprises at most 0.05% by weight of nigrosin.

2. The polyamide composition according to claim 1, wherein the composition comprises at most 0.03% by weight of nigrosin.

3. The polyamide composition according to claim 2, wherein the composition comprises at most 0.01% by weight nigrosin.

4. The polyamide composition according to claim 3, wherein the composition comprises no nigrosin.

5. The polyamide composition according to claim 1, wherein the composition comprises, alongside components B and C, no other black-coloring dyes or pigments.

6. The polyamide composition according to claim 5, wherein the composition comprises, alongside components B and C, no other dyes or coloring pigments.

7. The polyamide composition according to claim 1, wherein the quantity of component C is from 0.03 to 0.5% by weight.

8. The polyamide composition according to claim 7, wherein the quantity of component C is from 0.05 to 0.3% by weight.

9. The polyamide composition according to claim 1, wherein lubricants and heat stabilizers are used as component E in quantities of respectively from 0.05 to 1.0% by weight, based on the entire composition.

10. The polyamide composition according to claim 1, where the polyamide is selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1212, PA 6.T, PA 9.T, PA 8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA 6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

11. The polyamide composition according to claim 10, where the polyamide is selected from PA 6, PA 66, PA 666 and PA 12.

12. The polyamide composition according to claim 11, where the polyamide is PA 66.

13. The polyamide composition according to claim 1, where component E comprises at least one polymer selected from:
homo- or copolymers which comprise, in copolymerized form, at least one monomer selected from $C_2$-$C_{10}$ monoolefins, 1,3-butadiene, 2-chloro-1,3-butadiene, vinyl alcohol and its $C_2$-$C_{10}$-alkyl esters, vinyl chloride, vinylidene chloride, vinylidene fluoride, tetrafluoroethylene, glycidyl acrylate, glycidyl methacrylate, acrylates and methacrylates having alcohol components of branched and unbranched $C_1$-$C_{10}$-alcohols, vinyl aromatics, acrylonitrile, methacrylonitrile, α,β-ethylenically unsaturated mono- and dicarboxylic acids, and maleic anhydride;
homo- and copolymers of vinyl acetals;
polyvinyl esters;
polycarbonates (PC);
polyesters;
polyethers;
polyetherketones;
thermoplastic polyurethanes (TPU);
polysulfides;
polysulfones;
polyether sulfones;
cellulose alkyl esters;
and mixtures thereof.

14. The polyamide composition according to claim 13, where component E comprises at least one polymer selected from styrene copolymers, polyalkyl (meth)acrylates, polycarbonates and mixtures thereof.

15. A molding produced from a polyamide molding composition according to claim 1.

16. A process for the production of a polyamide composition as defined in claim 1, where at least one synthetic polyamide A, at least one chromium complex dye B, carbon black C and optionally other additives are mixed with one another with heating to a temperature in a range from 160 to 340° C.

* * * * *